(12) United States Patent
Schubert

(10) Patent No.: US 7,285,870 B2
(45) Date of Patent: Oct. 23, 2007

(54) WIND POWER INSTALLATION COMPRISING AT LEAST TWO COMPONENTS AND A DATA NETWORK

(75) Inventor: Thomas Schubert, Ellerau (DE)

(73) Assignee: Nordex Energy GmbH, Norderstedt (DE)

(*) Notice: Subject to any disclaimer, the term of this patent is extended or adjusted under 35 U.S.C. 154(b) by 0 days.

(21) Appl. No.: 10/541,734

(22) PCT Filed: Dec. 23, 2003

(86) PCT No.: PCT/EP03/14767

§ 371 (c)(1),
(2), (4) Date: Jul. 7, 2005

(87) PCT Pub. No.: WO2004/063568

PCT Pub. Date: Jul. 29, 2004

(65) Prior Publication Data

US 2006/0100748 A1    May 11, 2006

(30) Foreign Application Priority Data

Jan. 8, 2003    (DE) ................ 103 00 174

(51) Int. Cl.
H02P 9/40    (2006.01)

(52) U.S. Cl. .............. 290/44; 290/42; 290/40 C; 290/40 A; 322/52

(58) Field of Classification Search ............. 290/43, 290/44, 55, 1 R, 54, 42, 40 C, 40 A; 322/2 R, 322/29, 32, 44, 54

See application file for complete search history.

(56) References Cited

U.S. PATENT DOCUMENTS

| | | | | |
|---|---|---|---|---|
| 4,023,139 A | | 5/1977 | Samburg ............... 340/147 |
| 4,410,806 A | * | 10/1983 | Brulle ................... 290/44 |
| 4,906,060 A | * | 3/1990 | Claude .................. 322/29 |
| 5,083,039 A | * | 1/1992 | Richardson et al. ..... 290/44 |
| 5,278,773 A | | 1/1994 | Cousineau ............. 364/494 |
| 5,285,112 A | * | 2/1994 | Mann .................... 290/44 |
| 5,798,631 A | * | 8/1998 | Spee et al. .............. 322/25 |
| 5,852,353 A | * | 12/1998 | Kochanneck ........... 318/558 |
| 6,100,600 A | * | 8/2000 | Pflanz .................. 290/54 |
| 6,137,187 A | * | 10/2000 | Mikhail et al. ......... 290/44 |
| 6,249,058 B1 | * | 6/2001 | Rea .................... 290/55 |
| 6,320,272 B1 | * | 11/2001 | Lading et al. .......... 290/44 |

(Continued)

FOREIGN PATENT DOCUMENTS

DE    196 52 673 A1    6/1998

(Continued)

OTHER PUBLICATIONS

"Windturbines—Fundamental, Technologies, Application &Economics" by Erich Hau, pp. 329-332, no date provided.

*Primary Examiner*—Darren Schuberg
*Assistant Examiner*—Iraj A. Mohandesi
(74) *Attorney, Agent, or Firm*—Vidas, Arrett, Steinkraus

(57) ABSTRACT

Wind power installation for generating electrical energy with at least two components which respectively have sensors and actuators and comprise a control unit, each of the control units being connected to a data network and exchanging with the control units of the other components, signals for the operating conditions of the components, detected sensor values and/or control signals for the other components.

14 Claims, 1 Drawing Sheet

U.S. PATENT DOCUMENTS

| | | | |
|---|---|---|---|
| 6,420,795 B1 * | 7/2002 | Mikhail et al. | 290/44 |
| 6,420,796 B1 * | 7/2002 | Lagerwey | 290/44 |
| 6,661,111 B1 * | 12/2003 | Wobben | 290/43 |
| 2002/0029097 A1 | 3/2002 | Pionzio, Jr. et al. | 700/286 |

FOREIGN PATENT DOCUMENTS

| | | |
|---|---|---|
| DE | 197 31 918 A1 | 1/1999 |
| DE | 100 11 393 A1 | 9/2001 |

* cited by examiner

WIND POWER INSTALLATION COMPRISING AT LEAST TWO COMPONENTS AND A DATA NETWORK

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The present invention relates to a wind power installation for generating electrical energy, with at least two components which respectively have sensors and actuators and comprise a control unit. At present, known wind power installations have a central automation system. This system has a central control system which controls the wind power installation via special hardware components, such as for example SPS and bus connections. In this connection, specific functions and specially adapted software are used which make use of a manufacturer-specific functional scope. It is therefore not possible to replace individual pieces of equipment easily in the wind power installation. An alteration to one component necessitates complex alterations to the control system.

The object of the invention is to provide a wind power installation, in the control system of which no, or only small, adaptations are required when replacing individual parts of the wind power installation.

BRIEF SUMMARY OF THE INVENTION

Advantageous embodiments form the subject of the subclaims.

The wind power installation according to the invention consists of at least two components which respectively have sensors and actuators. Each of the control units is connected to a data network for the exchange of data and signals. Each component exchanges with the other components, signals for the operating conditions of the component, detected sensor values and/or control signals for the other components via the control unit associated with said component.

In the wind power installation according to the invention, a central control system is dispensed with. The control system is based on the individual components. This approach of a component-based control system of the wind power installation is based on the recognition that the signal exchange between the components is sufficient for controlling a wind power installation and does not require a central control system but can be modularised without loss of speed and accuracy. With the construction of the wind power installation according to the invention, individually occurring operating conditions of the components are controlled according to specific parameters for the components. The communication of the operating conditions between the components, however, is carried out irrespective of specific parameters. A consequence of this is that components from different manufacturers can be interchanged, without alterations being required to the control routines of the other components.

In a preferred embodiment each component is exclusively controlled by the control unit associated therewith. In this embodiment, a control system is avoided where a control unit directly controls a component not associated therewith.

A drive train unit and an electrical unit are preferably provided as components of the wind power installation. Each of these units has an individual control system which exchanges data with the other control system. In this connection, measured values in the components can naturally also be exchanged with one another.

It has been shown that the drive train unit can be split into further independent units. The drive train unit comprises a braking unit, a shaft unit, a generator unit or combinations of these units. In addition, the drive train can be provided with a gear box.

The electrical unit is expediently split into one or more independent units. In this connection, a grid connection unit, a converter unit, a transformer unit or a combination of these units prove to be expedient as units.

In wind power installations, whether offshore or on land, it is expedient to provide additionally a tower unit. The tower unit consists of a heating unit, a lifting unit, an access control unit or combinations of these units.

In order to ensure the communication between the units, it has proven to be expedient to use an ether network or a fieldbus network.

The wind power installation according to the invention will be described hereinafter in more detail with reference to a sketch.

DETAILED DESCRIPTION OF THE INVENTION

Figure 1:
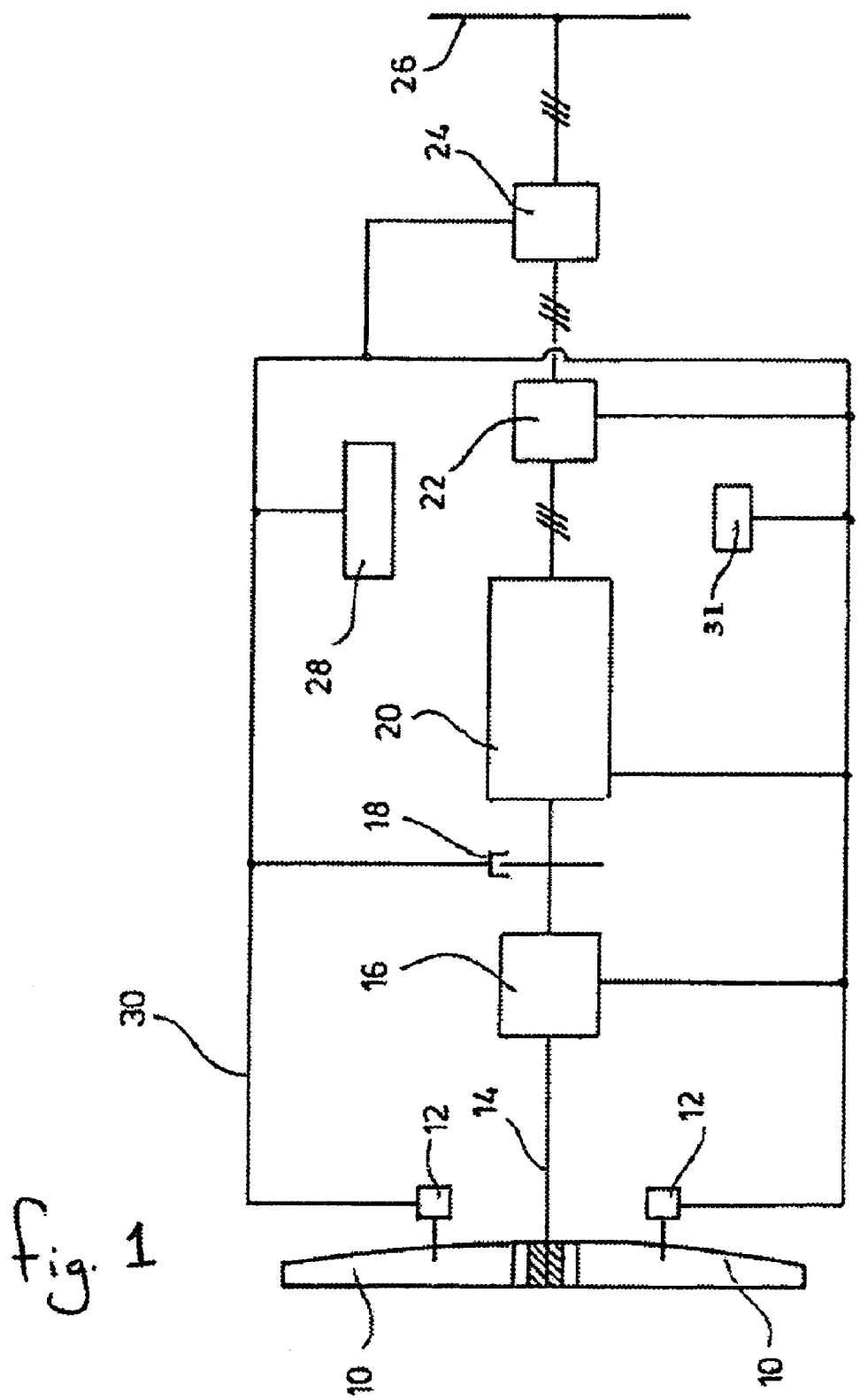
FIG. 1 shows the diagrammatic construction of a wind power installation.

While this invention may be embodied in many different forms, there are described in detail herein a specific preferred embodiment of the invention. This description is an exemplification of the principles of the invention and is not intended to limit the invention to the particular embodiment illustrated.

The rotor blades 10 shown have a pitch control 12 for adjusting the rotor blade angle. The rotor shaft 14 terminates in a gear box 16. The output shaft of the gear box 16 is additionally provided with a braking system 18 and terminates in a generator 20. The electrical energy generated by the generator 20 is adapted in a converter 22 to the grid requirements and fed via the connector 24 into the grid system 26. A cooling system 28 and an azimuthal drive 31 are additionally provided in the nacelle.

Further components, for example for the monitoring and diagnosis of the operation, can be provided in the nacelle.

All components are connected to an ether network 32, via which data and signals can be received and transmitted for other components.

In the wind power installation according to the invention, the necessary control system is present on the main components to automate the entire system. In this connection, the advantage is that the interfaces with all component suppliers are clearly defined and the components communicate with one another via the defined interfaces. This results in the components being able to be replaced quickly and inexpensively irrespective of individual suppliers. Moreover, it is advantageous that signals can be incorporated therewith to monitor the components.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Wind power installation for generating electrical energy with at least two components, each of the at least two components respectively have sensors and/or actuators and comprise a control unit, each of the control units being connected to a data network and the data network being used for interconnecting the at least two control units and for exchanging signals for the operating conditions of the components, detected sensor values and/or control signals for the other components, with the control units of the other components.

2. Wind power installation according to claim 1, characterised in that each control unit of a component exclusively controls said component.

3. Wind power installation according to claim 2, characterised in that a drive train unit (12, 16, 18) and an electrical unit (20, 22, 24) are provided as components.

4. Wind power installation according to claim 3, characterised in that the drive train unit comprises one or more of the following units as independent units, braking unit (18), shaft unit (14), generator unit (20).

5. Wind power installation according to claim 4, characterised in that the drive train additionally comprises a gear box (16).

6. Wind power installation according to claim 3, characterised in that the electrical unit comprises one or more of the following units as independent units: grid connection unit (24), converter unit (22), transformer unit.

7. Wind power installation according to claim 1, characterised in that a tower unit is provided as an additional component.

8. Wind power installation according to claim 7, characterised in that the tower unit has one or more of the following units as components as heating device, lifting device and access control device.

9. Wind power installation according to claim 1, characterised in that an ether network (30) is provided as a data network.

10. Wind power installation according to claim 1, characterised in that a fieldbus network is provided as a data network.

11. Wind power installation for generating electrical energy with at least two control units, each of the at least two control units comprising a component and controlling at least one device, the at least one device selected from at least one member of the group consisting of sensors, actuators and any combination thereof, each of the at least two control units being connected to a data network, each of the at least two control units using the data network to exchange data with one another.

12. The wind power installation of claim 11, the data being at least one of detected sensor values, control signals for the other control units, signals for the operating conditions of the control units and any combination thereof.

13. The wind power installation of claim 11, the component is selected from the group consisting of pitch control, rotor shaft, gear box, generator, cooling system, azimuthal drive, drive train unit, an electrical unit, a braking unit, a shaft unit, a generator unit, a grid connection unit, a converter unit, a transformer unit, a tower unit, a heating unit, a lifting unit, and an access control unit.

14. Wind power installation for generating electrical energy with at least two components each of the at least two components respectively have sensors and/or actuators and comprise a control unit, each control unit of a component exclusively controlling the component, each of the control units being connected to a data network and the data network being used for interconnecting the at least two control units and for exchanging signals for the operating conditions of the components, detected sensor values and/or control signals for the other components, with the control units of the other components.

* * * * *